Sept. 20, 1949.  C. J. STRID ET AL  2,482,223
SELF-ALIGNING POPPET VALVE
Filed Oct. 13, 1945
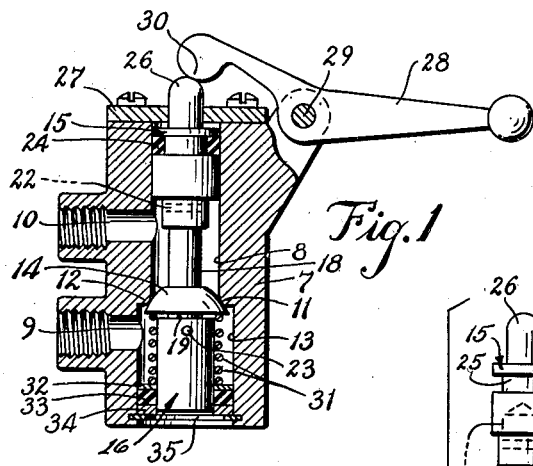
Fig.1
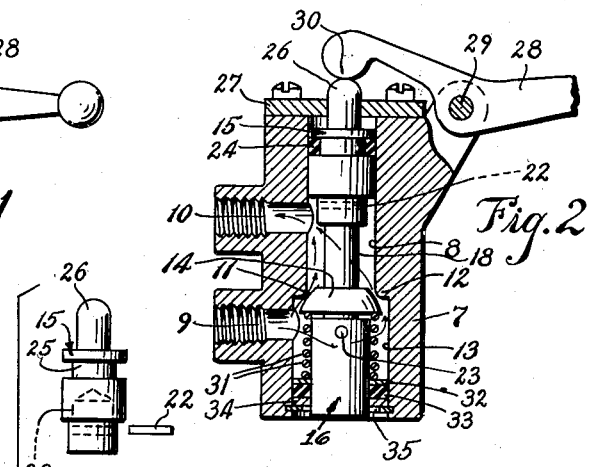
Fig.2
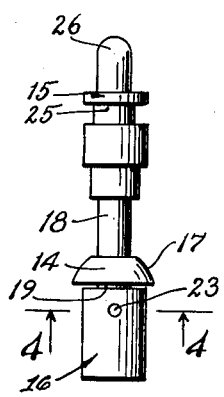
Fig.3
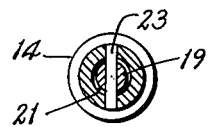
Fig.4
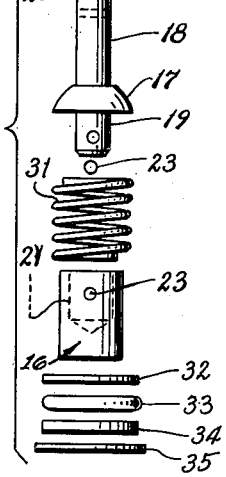
Fig.6
Fig.5
INVENTOR.
Carl J. Strid & Joseph R. Blake
BY
R. S. Berry Patented Sept. 20, 1949

2,482,223

UNITED STATES PATENT OFFICE 2,482,223

SELF-ALIGNING POPPET VALVE

Carl J. Strid, La Canada, and Joseph R. Blake, La Crescenta, Calif., assignors to Adel Precision Products Corp., a corporation of California Application October 13, 1945, Serial No. 622,138

7 Claims. (Cl. 251—132)

This invention relates to poppet valves for use in hydraulic and other systems to control the flow of fluid therein, and resides in the provision of a valve of this character which is constructed and arranged to provide the improvements and advantages as follows:

1. A reliable self-aligning and self-seating action of the valve member so that under extremely high pressures the valve will seat properly regardless of any eccentricities or irregularities in the valve body structure or in the component parts of the valve as a whole, thereby making it possible to quickly, easily and inexpensively manufacture and assemble the valve without requiring the close machining operations and minute tolerances usually necessitated for high pressure poppet valves.

2. A counter-balanced valve construction which makes it possible to readily and easily unseat the valve against a fluid pressure of the order of 3000 p. s. i. or more.

3. The provision for quickly and easily assembling and dis-assembling the valve so that a ready replacement of parts may be effected.

4. A construction and arrangement such that each part of the valve unit may be inexpensively produced and a minimum of such parts are required to complete the valve.

5. A novel articulated valve assembly including three sections or parts flexibly joined to one another so that not only is the valve element of such parts made self-aligning and positive in its seating action, but wear of such sections is minimized and a novel and reliable sealing means of simple construction is made possible.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a vertical sectional view of a valve embodying the present invention showing the valve closed;

Fig. 2 is a view similar to Fig. 1 with the valve opened;

Fig. 3 is an elevational view of the sectional and articulated valve assembly removed from the valve body or housing therefor;

Fig. 4 is a cross sectional view taken on the line 4—4 of Fig. 3;

Fig. 5 is an elevational view similar to Fig. 3 of the articulated valve unit, showing how the sections are relatively movable to make the valve element self-aligning.

Fig. 6 is an exploded view of the articulated valve unit and certain associated parts.

One embodiment of the present invention as shown in the accompanying drawing includes an elongated valve body member or housing 7 having a valve-receiving bore 8 extending longitudinally therethrough and provided with an intake port 9 and an outlet port 10 which ports open into said bore at axially spaced points therein.

An annular valve seat 11 is provided between the ports 9 and 10 on a shoulder 12 formed by an enlargement 13 of the bore 8, said enlargement extending from said shoulder to one end of the bore. The intake port 9 opens into the enlargement 13 between said seat and said one end of said bore 8 while the outlet ports open into the bore at a point adjacent the other end of said bore.

In accordance with our invention an articulated, sectional poppet valve unit with associated sealing means are mounted in the bore 8 so that the elements of the unit are relatively universally movable whereby the valve member will be self-aligning and seat properly regardless of eccentricities or irregularities in the construction of the bore 8 and enlargement 12, or of the component parts of the valve unit and sealing means. Accordingly this valve unit is made up of a poppet valve member 14 as the center section and guide members 15 and 16 as the end sections, and said sections are pivotally joined and so constructed so that they are relatively movable about the axes of their pivotal connections.

As here shown the valve member 14 has a spherical seating surface 17 to assure proper seating thereof when the valve member is moved relative to the guide members 15 and 16 or the latter are moved relative to the valve member in a self-adjusting action to compensate for an eccentricity or irregularity in the valve structure or components thereof which concentricity or irregularity, if not compensated for, would cause the valve to jam or seat unevenly or improperly.

Projecting from opposite sides of the valve member 14 are coaxial rigid stems 18 and 19 loosely positioned in sockets 20 and 21 in the guide members 15 and 16 respectively and pivoted to said guide members by means of pivot pins 22 and 23. These pivot pins extend at right angles to one another so that the valve member and two guide members are relatively movable about the axes of said pins, whereby the valve member will automatically align with its seat and seat properly thereon in case of irregularities in the alignment of the bore portions and other components of the valve structure.

The guide member 15 for the most part has a working fit in the bore 8 between the outlet port 10 and the adjacent end of said bore, the inner end of the guide member being reduced where connected to the stem 18. An elastic sealing ring 24 is carried in a groove 25 in the guide 15 to seal the adjacent end of the bore 8.

An operating stem 26 projects from the guide member 15 through an end plate 27 so that it may be pushed inwardly to unseat the valve member 14. As here shown an operating lever 28 is pivoted as at 29 on the body 7 so that a rounded end 30 thereon will contact the stem 26 for pushing in and releasing the stem to unseat and seat the valve member.

The guide member 16 is positioned in the enlargement 13 of bore 8 and has such a smaller diameter than the enlargement that it is well circumferentially spaced from the surrounding wall thereof and provides an annular passage therein accommodating free flow of fluid, also a coiled spring 31 which surrounds the guide member 16. One end of this spring abuts the valve member 14 while the other end rests upon a washer 32 which in turn rests upon an elastic sealing ring 33 supported on another washer 34 held in the adjacent end of bore 8 by a snap ring 35. The guide member 16 extends through this assembly of washers and rings but does not necessarily project beyond the adjacent end of the bore 8 whereby any suitable closure (not shown) may be used at the lower end of the bore. With this arrangement the spring 31 tends to seat the valve member 14 and it is seen that the guide members make it possible to effectively seal the ends of the bore 8 with a simple but reliable sealing means in which the elastic sealing rings are compressed into fluid tight engagement with the guides and surrounding wall of bore 8 responsive to fluid pressure in said bore.

It should be noted that the guide member 16 has approximately the same diameter as the valve seat 11 so that the valve unit is substantially balanced regardless of the incoming pressure and therefore is seated primarily by the force of the spring 31. With this arrangement it is only necessary to overcome the force of the spring to unseat the valve against pressures of 3000 p. s. i. and more.

While we have shown and described specific embodiments of our invention we do not limit ourselves to the exact details of construction set forth, and the invention embraces such changes, modifications and equivalents of the parts and their formation and arrangement as come within the purview of the appended claims.

We claim:

1. In a poppet valve, a body member having a valve-receiving bore extending therethrough and inlet and outlet ports opening into said bore at points axially spaced along said bore, a valve seat in said bore between said ports, and an enlargement of said bore between one end thereof and said seat into which enlargement said intake port opens, a poppet valve member movable in said enlargement into and out of contact with said seat, guide members mounted in said bore on opposite sides of said valve member, means pivotally connecting said guide members with said valve member whereby said valve member and said guide members are relatively movable about the axes of the pivotal connections thereof, one of said guide members including a piston portion having a working fit in that part of the bore between said outlet port and the other end of said bore, an operating stem projecting from said piston portion out through said bore whereby it may be contacted and pushed inwardly to unseat said valve member, a sealing means on said piston portion for closing said other end of said bore, the other of said guide members being disposed in said enlargement and having a diameter such that an annular passage is provided between it and the surrounding wall of the enlargement, a sealing means surrounding said other guide member and fixed within the first named end of said bore, a spring surrounding said second guide member and abutting said valve member and the last named sealing means so as to urge said valve member against its seat.

2. In a poppet valve, a body member having a valve-receiving bore extending therethrough and inlet and outlet ports opening into said bore at points axially spaced along said bore, a valve seat in said bore between said ports and an enlargement of said bore between one end thereof and said seat, into which enlargement said intake port opens, a poppet valve member movable in said enlargement into and out of contact with said seat, guide members mounted in said bore on opposite sides of said valve member, means pivotally connecting said guide members with said valve member whereby said valve member and said guide members are relatively movable about the axes of the pivotal connections thereof, one of said guide members including a piston portion having a working fit in that part of the bore between said outlet port and the other end of said bore, an operating stem projecting from said piston portion out through said bore whereby it may be contacted and pushed inwardly to unseat said valve member, a sealing means on said piston portion for closing said other end of said bore, the other of said guide members being disposed in said enlargement and having a diameter such that an annular passage is provided between it and the surrounding wall of the enlargement, a sealing means surrounding said other guide member and fixed within the first named end of said bore, a spring surrounding said second guide member and abutting said valve member and the last named sealing means so as to urge said valve member against its seat, said valve member having a spherical portion disposed to contact said seat.

3. In a poppet valve, a body member having a velve-receiving bore extending therethrough and inlet and outlet ports opening into said bore at points axially spaced along said bore, a valve seat in said bore between said ports and an enlargement of said bore between one end thereof and said seat, into which enlargement said intake port opens, a poppet valve member movable in said enlargement into and out of contact with said seat, stems projecting from opposite sides of said valve member, guide members mounted in said bore on opposite sides of said valve member, means pivotally connecting said guide members with said stems whereby said valve member and said guide members are relatively movable about the axes of the pivotal connections thereof, a spring means for closing said valve member, and means operable through one of said guide members for unseating said valve member.

4. In a poppet valve, a body member having a valve-receiving bore extending therethrough and inlet and outlet ports opening into said bore at points axially spaced along said bore, a valve seat in said bore between said ports and an enlargement of said bore between one end thereof and said seat, into which enlargement said intake port opens, a poppet valve member movable in said enlargement into and out of contact with said seat, guide members mounted in said bore on opposite side of said valve member, means pivotally connecting said guide members with said valve member whereby said valve member and said guide members are relatively movable about the axes of the pivotal connections thereof, a spring means for closing said valve member, and means operable through one of said guide members for unseating said valve member, the other of said guide members being circumferentially spaced from the surrounding wall of said enlargement, and a sealing means fixed in said enlargement adjacent said last named end of said bore and through which said one guide member is slidable.

5. In a poppet valve, a body member having a valve-receiving bore extending therethrough and inlet and outlet ports opening into said bore at points axially spaced along said bore, a valve seat in said bore between said ports, and an enlargement of said bore between one end thereof and said seat into which enlargement said intake port opens, a poppet valve member movable in said enlargement into and out of contact with said seat, guide members mounted in said bore on opposite sides of said valve member, means pivotally connecting said guide members with said valve member whereby said valve member and said guide members are relatively movable about the axes of the pivotal connections thereof, one of said guide members including a piston portion having a working fit in that part of the bore between said outlet port and the other end of said bore, an operating stem projecting from said piston portion out through said bore whereby it may be contacted and pushed inwardly to unseat said valve member, a sealing means on said piston portion for closing said one other end of said bore, the other of said guide members being disposed in said enlargement and having a diameter such that an annular passage is provided between it and the surrounding wall of the enlargement, a sealing means surrounding said other guide member and fixed within the first named end of said bore, a spring surrounding said second guide member and abutting said valve member and the last named sealing means so as to urge said valve member against its seat, said second named guide member having a diameter substantially equal to that of said valve seat.

6. In a poppet valve, a body member having a valve-receiving bore extending therethrough and inlet and outlet ports opening into said bore at points axially spaced along said bore, a valve seat in said bore between said ports and an enlargement of said bore between one end thereof and said seat, into which enlargement said intake port opens, a poppet valve member movable in said enlargement into and out of contact with said seat, stems on opposite sides of said valve member, guide members mounted in said bore on opposite sides of said valve member, means pivotally connecting said guide members with said stems whereby said valve member and said guide members are relatively movable about the axes of the pivotal conections thereof, a spring means for closing said valve member, and means operable through one of said guide members for unseating said valve member, said one guide member having a diameter substantially equal to that of said valve seat.

7. In a poppet valve, a body member having a bore extending therethrough and provided with intake and outlet ports at points axially spaced along said bore, a valve seat between said ports, an enlargement of said bore between said valve seat and one end of said bore, a poppet valve member operable in said enlargement for movement into and out of contact with said seat, stems projecting from opposite sides of said valve member, guide members arranged in said bore on opposite sides of said valve member and having sockets therein into which said stems extend, pivots joining said stems with said guide members and extending substantially at right angles to one another whereby said guide members and valve member are relatively movable about the axes of said pivots, one of said guide members having a working fit in that part of said bore between said outlet port and the other end of said bore, a sealing ring carried by said one guide member and sealing said other end of said bore, an operating stem carried by said one guide member and extending out of said bore so that it is accessible for operation to unseat said valve member, an annular sealing means fixed in the first named end of said bore, the other of said guide members being circumferentially spaced from the surrounding wall of the enlargement of said bore and slidable through said annular sealing means in sealing contact therewith, and a spring surrounding said other guide member with its ends abutting said valve member and said annular sealing means and operating to seat said valve member.

CARL J. STRID.
JOSEPH R. BLAKE.

REFERENCES CITED

The following references are of record in the file of this patent:

UNITED STATES PATENTS

| Number | Name | Date |
| --- | --- | --- |
| 979,235 | Whitney | Dec. 20, 1910 |
| 1,584,007 | Brown | May 11, 1926 |
| 1,689,974 | Shallcross | Oct. 30, 1928 |
| 1,825,864 | Harter | Oct. 6, 1931 |
| 2,001,487 | Doherty | May 14, 1935 |